United States Patent [19]

Eisa et al.

[11] Patent Number: 4,837,697
[45] Date of Patent: Jun. 6, 1989

[54] OVERSPEED GOVERNOR FOR AN ELECTRONIC CONTROLLED FUEL SYSTEM

[75] Inventors: Soraya Eisa, South Bend; Joseph Peczkowski, Granger; Henry Tyler; Glenn Richardson, both of South Bend, all of Ind.

[73] Assignee: Allied-Signal Inc., Morristown, N.J.

[21] Appl. No.: 80,728

[22] Filed: Jul. 31, 1987

[51] Int. Cl.⁴ .............................................. F02C 9/38
[52] U.S. Cl. ........................... 364/431.02; 60/39.281; 364/431.01
[58] Field of Search ...................... 364/431.01, 431.02; 60/39.281

[56] References Cited

U.S. PATENT DOCUMENTS

| | | | |
|---|---|---|---|
| 4,245,462 | 1/1981 | McCombs, Jr. | 60/39.141 |
| 4,302,931 | 12/1981 | White et al. | 60/39.281 |
| 4,344,281 | 8/1982 | Schuster et al. | 60/39.281 |
| 4,393,651 | 7/1983 | Peck et al. | 60/39.281 |
| 4,578,945 | 4/1986 | Peck et al. | 60/39.281 |
| 4,602,479 | 7/1986 | Hansen | 60/39.281 |
| 4,716,723 | 1/1988 | Ralston et al. | 60/39.281 |
| 4,718,229 | 1/1988 | Riley | 60/39.281 |
| 4,738,597 | 4/1988 | d'Agostino et al. | 60/39.281 |

*Primary Examiner*—Felix D. Gruber
*Attorney, Agent, or Firm*—Leo H. McCormick, Jr.; Ken C. Decker

[57] ABSTRACT

A fuel management system (34) for a turbine engine (10) having a metering valve (50) controlled by the input of an electronic computer (36) to a resolver (48). A head sensor (64) responds to pressure differential across the metering valve (50), to control a bypass valve (80) which allows a portion of the fuel available from a supply conduit (58) to return to a reservoir (28). An overspeed governor (116) receives an input turbine (10) to position a cam (120) having four contours (154, 156, 158, and 160) thereon. The first contour (154) provides a feedback to balance the actual speed input. The second contour (156) controls the opening of a proportional valve (122) when the rotation of the turbine exceeds a preset value to allow an operational fluid pressure in the bypass valve (80) to be reduced and additional fuel to flow to the return conduit (95). The third contour (158) controls the movement of flapper valve (128) which allows an integrator piston (124) to move and open an integrator valve (126) to permit a further reduction in the operational fluid pressure such that an additional and corresponding amount of fuel is returned to the reservoir (28). The fourth contour (160) has a linkage (182) connected to the integrator piston (124) and in conjunction with the movement of the flapper valve (128) by the third contour at speeds up to about one half of the normal operational speeds allows the integrator piston (124) to move without opening the integrator valve (126) to provide assurance that the overspeed governor (116) is capable of functioning.

14 Claims, 4 Drawing Sheets

OVERSPEED GOVERNOR FOR AN ELECTRONIC CONTROLLED FUEL SYSTEM

This invention relates to an overspeed governor for use in a fuel management system having an electronic computer for the primary control of fuel to a turbine.

Every turbine engine has an optimum fuel to air ratio for operation that will produce a desired thrust. It is normal for a fuel management system to include electronic sensing and a computer which receives electrical signals representing variable engine operating conditions such as engine speed, power lever position, compressor inlet air temperature, altitude and other engine variables. The electronic computer evaluates these inputs and operates a metering valve such as disclosed in U.S. Pat. No. 4,245,462 to supply the optimum fuel to operate a turbine.

The rotation of the turbine can broadly be stated as a function of the fuel supplied from the metering valve. Most turbines are designed to operate at some rotational speed above their normal rotation in order to provide an additional amount of thrust for a short period of time without damaging the turbine.

It is common practice to provide a fuel management system for a turbine in an aircraft, with a mechanical back-up system, should an electrical failure occur in the primary control for the metering valve. This back-up system acts to limit the amount of fuel to operate the turbine but does not include many of the inputs that provide for the optimum operation.

It has been observed that an electrical error signal supplied to an on board computer can result in more fuel being supplied to the turbine than actually is desired for optimum operating conditions. Since the amount of fuel supplied to a turbine essentially controls the turbine speed if the amount of fuel supplied exceeds the optimum fuel, an overspeed condition may result.

In order to protect the turbine from an overspeed operation when operating in the electrical mode, a mechanical overspeed governor system has been devised.

SUMMARY OF THE INVENTION

The mechanical overspeed governor system includes a flyweight speed mechanism, a cam with four contours, an integrator piston, a proportional valve, an integral valve, and a flapper valve.

The flyweight speed mechanism receives an input from the turbine to sense the actual rotation of the turbine in response to fuel currently supplied as a result of the position of a metering valve by an electronic resolver. The flyweight speed mechanism moves a first valve to allow operational fluid to move an actuator and rotate the cam to a position corresponding to the rotation of the turbine. A feedback mechanism responsive to a first contour on the cam opposes the movement of the first valve to interrupt the flow of operational fluid to the actuator once the current speed position has been achieved.

The second contour on the cam provides the proportional valve with an input corresponding to the actual speed of the turbine. During normal operation of the turbine, the proportional valve inhibits the communication of an operational fluid from a head sensor to a return conduit connected to a supply reservoir. Should an overspeed rotation of the turbine be indicated by the speed position of the second contour, the proportional valve opens a port to develop a pressure drop in the operational fluid at a head sensor and a bypass valve. The pressure drop at the bypass valve moves a piston to allow a portion of the fuel supplied to the metering valve to flow to the return conduit. Thus, even though the metering valve remains stationary in the position established by the electronic resolver, the fuel supplied to the turbine is reduced and the overspeed condition should be thereafter rectified.

If the rotational speed of the turbine sensed by the flyweight speed mechanism exceeds a predetermined rotational speed, the cam is rotated to a position where the third contour moves the integrator piston and integral valve to open a second port and further reduce the pressure drop in the operational fluid such that the bypass valve is further opened to allow additional fuel to flow to the return rather than be supplied to the turbine as a function of the position of the metering valve.

Should the input from the flyweight speed mechanism rotate the cam to indicate an overspeed such that continual rotation of the turbine could cause damage or irreparable harm, the fourth contour supplies a flapper valve with an input such that an additional pressure drop is created in the operational fluid. In this condition, the additional pressure drop further opens the bypass valve to allow more fuel to flow to the return.

With the flapper valve opened, the integrator piston moves to a position such that the actual speed of the turbine as sensed by the flyweight speed mechanism does not move the cam to close the flapper valve and a switch is activated which places the electronic resolver in an inactive position. Thereafter a mechanical backup control supplies the metering valve with the operational input for operating the turbine.

It is an object of this invention to provide a fuel management system with a mechanical governor to prevent an overspeed rotation of a turbine when an electronic resolver controls the flow of fuel to operate the turbine.

It is a further object of this invention to provide an overspeed governor with a proportional valve and an integral valve to sequentially lower the fluid pressure acting on a bypass valve which controls the flow of fuel to a return conduit and thereby correspondingly reduce the fuel supplied to operate a turbine.

An advantage of this invention resides in the mechanical governor which overrides the operation of a metering valve by an electronic resolver to maintain the actual rotation of the turbine within set limits and thereby prevent an overspeed condition which could damage the turbine.

These objects and advantages should be apparent from reading this specification while viewing the drawings.

DETAILED DESCRIPTION OF THE INVENTION

Figures 1, 5, 6:
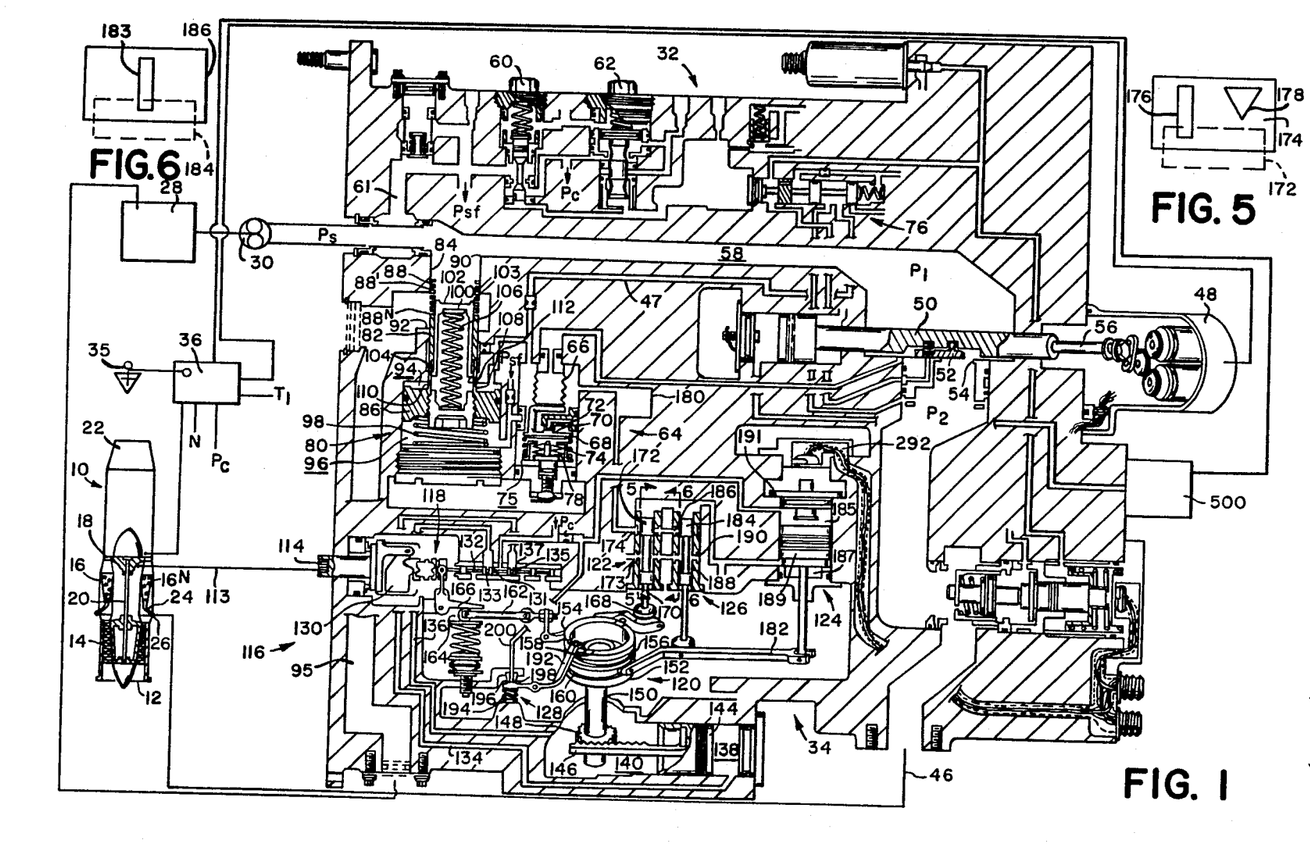
FIG. 1 is a schematic representation of a fuel management system for a turbine having a mechanical governor for limiting the flow of fuel to a turbine mode according to the principles of the invention.
FIG. 5 is a view through line 5—5 of FIG. 1 showing the entrance port of the proportional valve.
FIG. 6 is a view through line 6—6 of FIG. 1 showing the entrance port of the integrator valve.

A conventional gas turbine engine 10 shown in FIG. 1 has an air inlet 12, an air compressor 14, a plurality of combustion chambers 16, $16^N$, a gas turbine 18 connected via a shaft 20 to the compressor 14 to drive the same, and an exhaust nozzle 22 from which the products of combustion are expelled to the atmosphere. A plurality of fuel injection nozzles 24 connected to a fuel manifold 26 are adapted to inject metered pressurized fuel into the combustion chambers 16, $16^N$ where the resulting air fuel mixture is burned to generate hot motive gas that passes through turbine 18 to drive compressor 14 and thereafter exhausted though nozzle 22 into the atmosphere to generate a propelling thrust.

A metered flow of fuel is supplied to fuel manifold 26 from fuel tank 28 by an engine driven fuel pump 30 of the positive displacement type. A fuel management system 32 including a hydromechanical governor control section 34 and an electronic sensing and signal computer 36 which controls the flow of fuel to the fuel manifold 26.

The electronic sensing and signal computing section 36 is structurally and operationally conventional in that it receives electrical input signals representing selected variable conditions of engine operation as, for example, engine speed N, compressor discharge air pressure $P_c$, power lever 35 position PLA and compressor inlet air temperature $T_i$ or other engine temperatures. The electrical input signals are sensed and compared electronically on a conventional manner resulting in a computed electrical signal which may be suitably amplified and discharged as an electrical output signal to operate the electrohydraulic servovalve 500 and the resolver 48 which position a metering valve 50 to control the flow of fuel to the fuel manifold 26 by way of conduit 46.

The metering valve 50 has a flat plate 52 that controls the flow of fuel through a triangular shaped port 54 to conduit 46 in response to movement of stem 56 by the operation of the electronic computer 36 input to resolver 48.

A portion of the fuel flowing from pump 30 is diverted through conduit 61 to servo regulator valves 60 and 62 to provide an operational fluid having a substantially constant pressure $P_c$. When the supply fuel reaches the metering valve 50 through conduit 58 it has a fluid pressure $P_1$. The restricted flow of the fuel through port 54 produces a pressure drop such that the fuel supplied to the fuel manifold now has a fluid pressure $P_2$.

The rotation of shaft 20 in turbine 10 is a direct function of the position of metering valve plate 52 and the pressure differential $(P_1 - P_2)$ established across metering valve plate 52.

A head sensor 64 has a bellows 66 which receives the fluid pressure $P_1$ from the metering valve 50 and acts on a movable member 68. Moveable member 68 has a face 70 which is urged toward seat 72 by an adjustable spring 74 and the fluid pressure $P_2$ which is communicated from conduit 46 by way of conduit 47 connected to shut off shuttle valve 76. A series of bi-metal disc 78 concentrically positioned inside spring 74 provides for changes in temperature that could affect the specific gravity of the fuel supplied to fuel manifold 26.

A bypass valve 80 of the type disclosed in U.S. No. Pat. No. 3,106,934 is connected to the head sensor 64 has a sleeve 82 located in a bore 84. Sleeve 82 is of the integrating and proportional flow type disclosed in U.S. Pat. No. 3,106,934 which is attached to an integrator piston 86 which separates $P_2P$ chamber 94 from a reference or $P_x$ chamber 96. Sleeve 82 has a series of openings 88, 88' . . . $88^N$ located adjacent to the end thereof to control communication from bore 84 to port 92 in return conduit 95 connected to reservoir 28. A spring 98 in $P_x$ chamber 96 and the fluid pressure $P_{sf}$ (fluid from conduit 61 prior to passing through regulator 60) act on and urges integrator piston 86 toward chamber 94 in opposition to the fluid pressure $P_2P$ located in chamber 94. A proportional piston 100 located in sleeve 82 has a face 102 on one end and a lip 104 on the other end. A spring 106 is located between integrator piston 86 and the proportional piston 100. The fluid pressure $P_2P$ in chamber 94 is communicated to the interior of sleeve 82 by openings 110 and 112. Spring 106 and fluid pressure $P_2P$ act on proportional piston 100 to urge lip 104 toward a shoulder 108 on the sleeve 82 in opposition to the fluid pressure $P_1$ in the supply fuel at port 90 in conduit 58. Depending on the fluid pressure $P_2 P$ acting on integrator piston 86, the sleeve 82 moves to provide communication from bore 84 through openings 88, 88' . . . $88^N$ to the port 92. At the same time the pressure differential between the fuel supply $P_1$ and the fluid pressure $P_2 P$ acting on piston 100 move face 102 to define the number of openings 88, 88' . . . $88^N$ through which fuel may flow to the return conduit 95.

The fuel supplied to turbine 10 causes shaft 20 to rotate. This drive rotation is transmitted through flexible conduit 113 to shaft 114 of the mechanical governor system 116.

The mechanical governor system 116, which includes a flyweight speed mechanism 118, a cam 120, a proportional valve 122, an integrator piston 124 and valve 126 and flapper valve 128, responds to the rotation of the shaft 20 to prevent an overspeed condition from occurring during operation of the metering valve 50 by the electronic resolver computer 36.

The flyweight speed mechanism 118 provides the operational speed sense for mechanical governor system 116. The shaft 114 rotates as a function of the rotation of shaft 20 in the turbine 10 to move weight 130 and position slide valve 132. Movement of slide valve 132 controls the flow of operational fluid having a fluid pressure $P_c$ (fluid from regulator 60) to either conduit 134 or 136 connected to chambers 138 and 140, respectively of cam means 120.

Actuator piston 144 which separates chambers 138 from chamber 140 has a rack member 146 which engages piston 148 to rotate shaft 150. A cylinder 152 attached to shaft 150 has four contoured surfaces 154, 156, 158 and 160 thereon. Piston 144 moved by the fluid pressure $P_c$ of the operational fluid moves rack 146 to rotate shaft 150 and positions the contours 154, 156, 158 and 160 on the cylinder 152 to a location corresponding to the rotation of shaft 20 in the turbine 10.

Contour 154 has feed back linkage 162 which moves roller 164 which acts on arm 166 to balance the speed force of weights 130 acting on slide valve 132.

Contour 156 has linkage 168 which is connected to shaft 170 of the proportional valve 122.

Proportional valve 122 has a land 172 which moves past port 174 to connect chamber 75 in the head sensor 64 with the body of the control 34 through exit port 173.

As best seen in FIG. 5, port 174 has a rectangular opening 176 and a triangular opening 178. Rectangular opening 176 is designed to be opened first and initiate flow from accumulator 180 associated with head sensor 64. If the movement of land 172 by linkage 168 is large, flow occurs through both openings 176 and 178 to provide for an initial pressure drop in the fluid pressure from $P_2$ to $P_2P$.

Contour 160 has linkage 182 that is connected to both the integrator piston 124 and integrator valve 126. The integrator piston 124 separates a first chamber 185 from a second chamber 187. Chamber 185 receives operational fluid having a fluid pressure $P_c$ while chamber 187 receives fluid from regulator 62 having a fluid pressure $P_{CR}$ which is a substantially constant and regulated fluid pressure. Movement of linkage 182 by integrator piston 124 is designed to be at about a 4:1 ratio of the movement of integrator valve 126. Valve 126 has a land 184 which moves (see FIG. 6) to open port 186 and provides an additional flow path for operational fluid from accumulator 180 to the body 34 through exit port 190 in way of bore 188. With the flow of operational fluid through port 186 to port 190, the fluid pressure drop from $P_2$ to $P_2P$ rapidly increases.

Contour 158 has linkage 192 that is connected to flapper valve 128. A spring 194 urges a face 196 against a seat 198 on conduit 200 connected to chamber 184. As linkage 192 moves in contour 160, face 196 moved away from seat 198 to lower the fluid pressure in chamber 185 and allow the integrator piston 124 to move toward chamber 185.

MODE OF OPERATION OF THE INVENTION

An operator supplies an operational input to power lever 35 to provide the electronic computing section 36 with an input. This input along with other operating parameters such as atmospheric air pressure, compressor discharge pressure, engine speed, inlet air temperature, altitude and engine temperature are evaluated in the development of an operational signal that is supplied to electronic computer 36 for moving metering valve 50 to define the opening of port 54 for the flow of fuel into conduit 46 connected to the fuel manifold 26. The fuel supplied to fuel manifold 26 is burned in chamber 16 causing an expansion of the gases therein, which on existing nozzle 22 rotates shaft 20. The rotation of shaft 20 is directly proportional to the fuel supplied to manifold 26. The restriction of the flow of fuel through port 54 causes a pressure drop to occur across the metering valve 50 such that the fuel in conduit 58 has a fluid pressure of $P_1$ and the fuel in conduit 46 has a fluid pressure of $P_2$.

Fluid pressure $P_1$ is communicated to the inside of bellows 66, while fluid pressure $P_2P$ is communicated, by way of shut off valve 76 and conduit 47 and acts on the outside of bellows 66 in head sensor 64. The pressure differential acting on the moveable member 68 positions face 70 against seat 72 to prevent the communication of operational fluid having a fluid pressure $P_{sf}$ to chamber 75. At the same time, fluid pressure $P_2P$ is communicated to chamber 94 in the bypass valve 80 to act on both integrator piston 86 and proportional piston 100 to position sleeve 82 and lip 103 with respect to port 92 and set the size of the opening to return conduit 95. The integral piston 86 which is controlled by the sensor 64 holds the pressure drop across the bellows 66 constant.

Rotation of shaft 20 is carried to the governor flyweight speed sensor 118 by flexible shaft 113. The weight 130 moves out to pull the spinning slide valve 132 such that land 133 moves past seat 131 to allow fluid having a fluid pressure $P_c$ to flow to chamber 138 while at the same time land 135 moves past seat 137 to open chamber 140 to the body pressure $P_B$. The pressure differential $P_C - P_B$ acts on piston 144 to move rack 146 and rotate cam 120 such that the first 154, second 156, third 158 and fourth 160 contours provide an operational input to the flyweight mechanism 118, proportional valve 122, flapper valve 128, and integrator piston checkout feature 124.

The feedback from the first contour 154 to the flyweight mechanism 118 provides a reaction force which balances the force of the weight 130 on slide valve 132. When the feedback force is equal to the force of weight 130, lands 133 and 135 close ports 131 and 137 and interrupt communication of fluid pressure $P_C$ to chamber 138.

During normal operation of the turbine, that is when the rotation of shaft 20 is below a fixed rotation, contours 156, 158 and 160 are designed to hold the proportional valve 12, integral valve 126 and integral piston 124 and flapper valve 128 in a substantially constant position.

As long as the rotation of shaft 20 is below a preset value, the mechanical governor 116 has no effect on the flow of fuel to fuel manifold 26. Should a malfunction occur in the electronic sensing or computing section 36, which directs the electrohydraulic servovalve 500 to move plate 52, such that the fuel supplied to operate the turbine 10 cause the rotational speed to increase above the preset value, the mechanical governor 116 is activated by the rotation of the flyweight 30 acting on the slide valve 132 and movement of the cam means 120.

Figure 2:
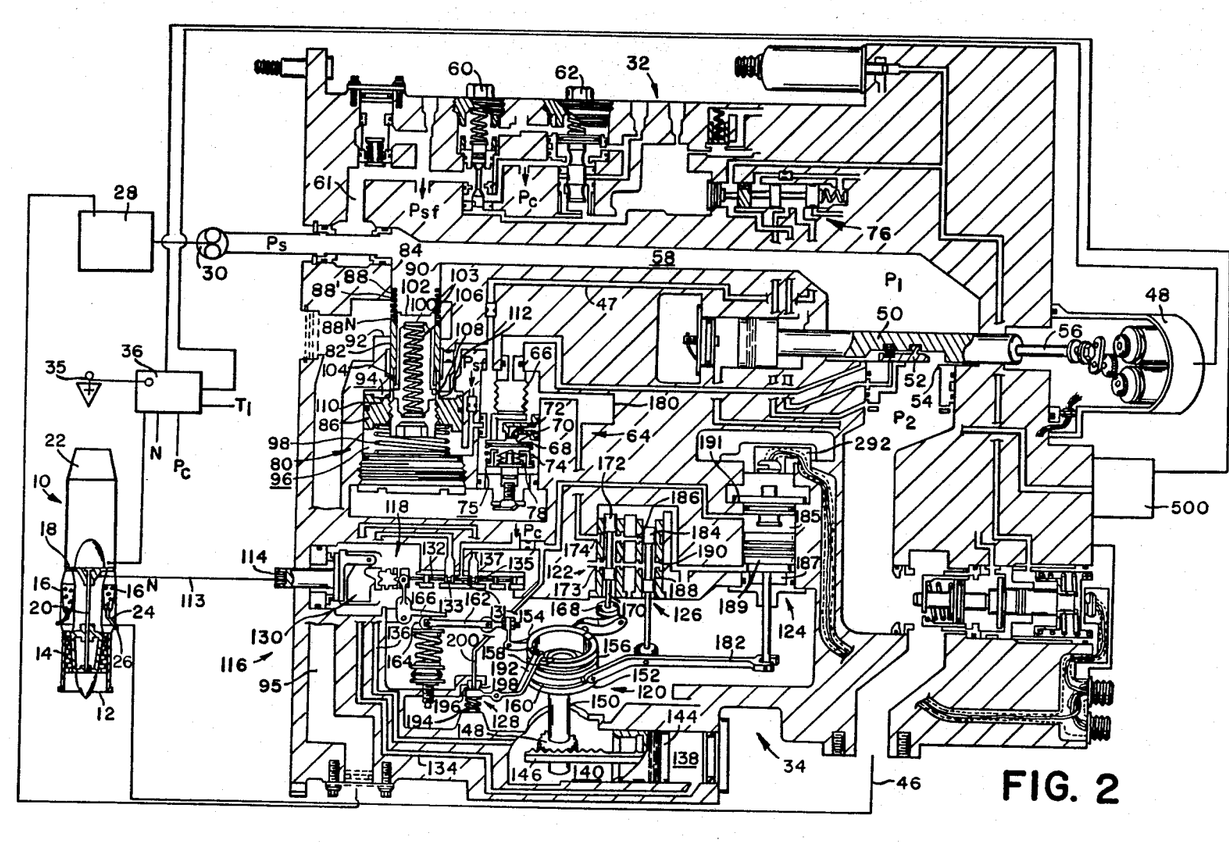
FIG. 2 is a schematic illustration of the fuel management system of FIG. 1 with a proportional valve in the mechanical governor activated as a result of the rotational speed of the turbine.

If the rotation of the shaft 20 is above a first limit of the preset rotation 10% or any other limit, the overspeed governor system 116 reacts in a manner as shown in FIG. 2. Proportional valve 122 reacts to speed and is brought into operation by the second contour 156. Land 172 sequentially moves past openings 176 and 178 (see FIG. 5) to allow fluid to flow from reservoir 180 to the body 34 through port 173. The fluid pressure $P_1$ acting on face 102 of proportional piston 100 in bypass valve 80 moves piston 100 toward integrator piston 86 to expose more opening 88, 88' ... $88^N$ and thereby allow a greater percentage of the fuel available in conduit 58 to flow into return conduit 95. This reduction in the volume or pounds of fuel supplied to the turbine 10 should result in a reduction in the shaft 20 rotation.

Figure 3:
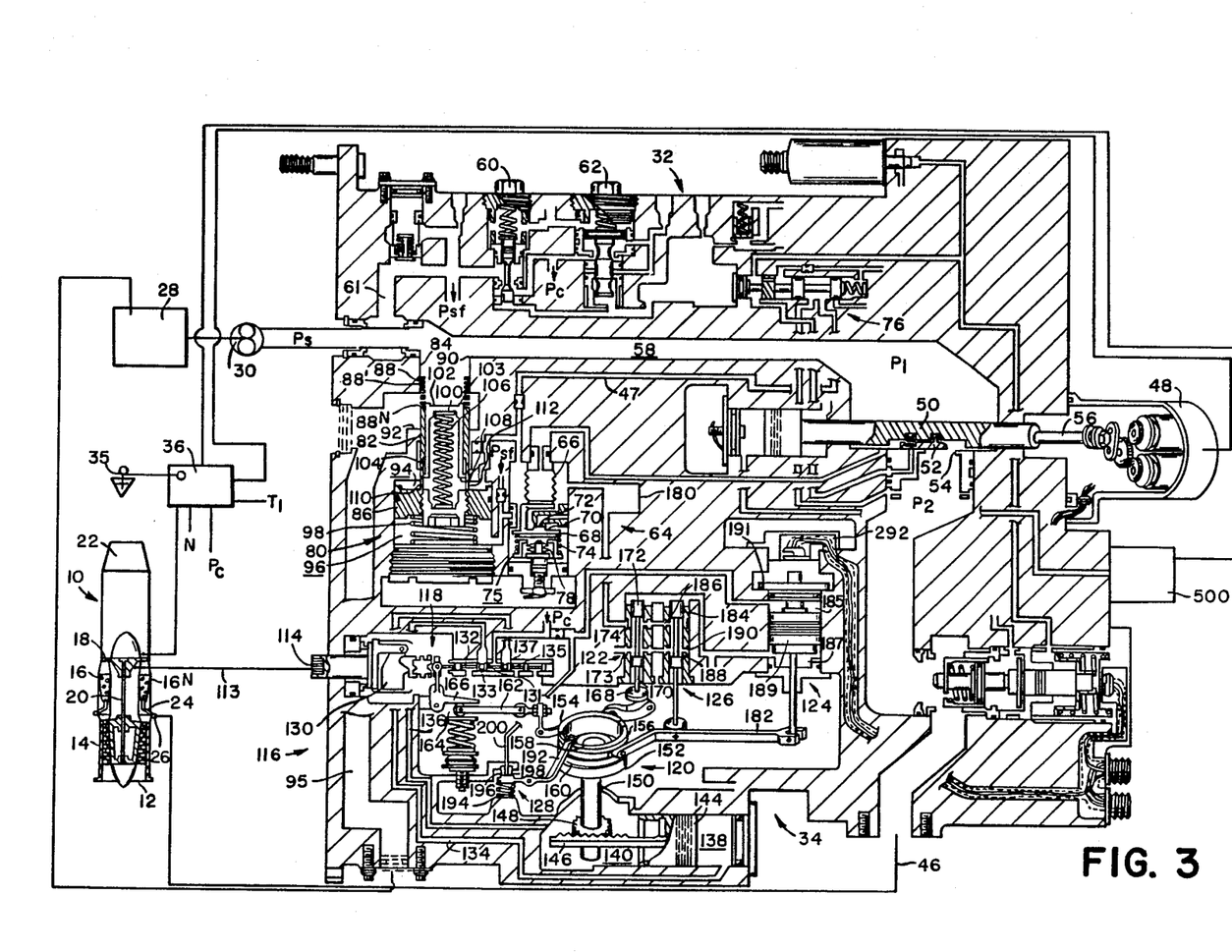
FIG. 3 is a schematic illustration of a fuel management system of FIG. 1 with an integral valve in the mechanical governor actuated as a result of the rotational speed of the turbine.

Should the shaft rotation be such that it exceeds second limit of the preset rotation, 13% or any other desired limit, the overspeed governor system 118 reacts in a manner as shown in FIG. 3.

Proportional valve 122 is fully opened and contour 158 moves flapper valve 128 which moves integral piston 124 to open integral valve 126. As piston 184 moves past port 186, additional fluid flows from reservoir 180 to further reduce the fluid pressure in chamber 94 to $P_2P$. This reduction in fluid pressure allows proportional piston 100 to further open and permit a corresponding increase in the fuel being returned in conduit 95.

Figure 4:
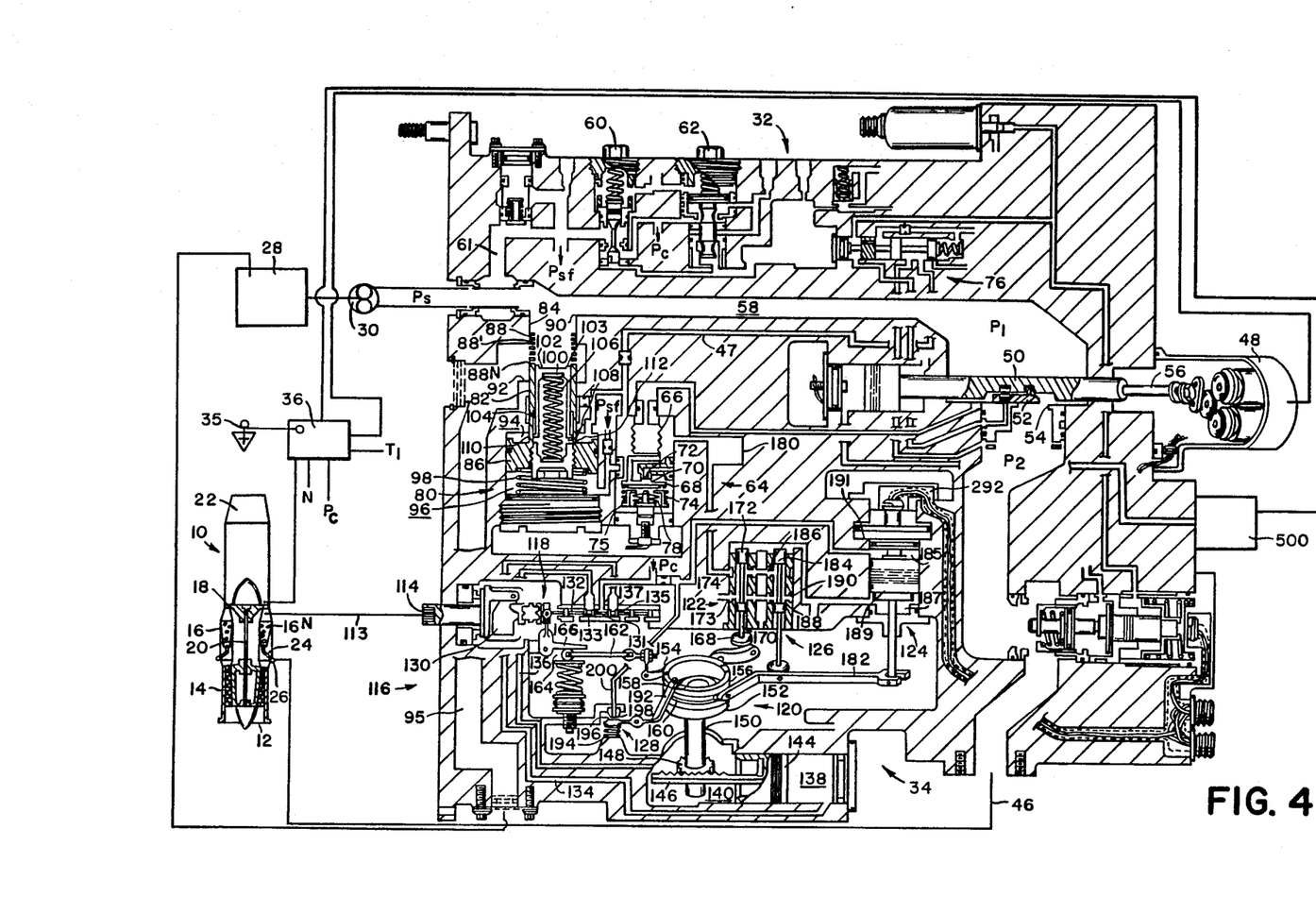
FIG. 4 is a schematic illustration of the fuel management system of FIG. 1 with a flapper valve in the mechanical governor actuated as a result of the rotational speed of the turbine.

Should the fuel supplied to nozzles cause shaft 20 to rotate and exceeds the acceptable operation or a thrust limit for the turbine, the rotation as transmitted by cable 113 to the mechanical governor system 116 produces a situation as illustrated in FIG. 4. In this situation proportional valve 122 and integral valve 126 are fully opened. During checkout at low speed (0% to 50% speed) contour 160 resets the integrator governor valve 126 away from its opening position so that the integrator piston checkout can occur without governor or action. Contour 158 acts on linkage 192 to move end 196 away from seat 198 and allow the operational fluid in chamber 185 to flow into the body 34. With flapper valve 128 opened, the fluid pressure $P_{CR}$ (fluid from regulator 62) in chamber 187 moves the integrator piston 189 into engagement with fixed cover 191 associated with sensor 292. A signal from sensor 292 is transmitted to the electronic computer unit 36 to indicate this operational condition.

On conclusion, the essence of this invention can be stated as follows: as the delta pressure ($P_2-P_2P$) at the head sensor 64 increases, the delta pressure ($P_1-P_2$) at the metering valve 50 decreases and as a result the metered fuel flow to the engine 10 results in a reduction in the rotation of the turbine shaft 20 to maintain the rotational speed within a set limit.

What we claim is:

1. In a fuel management system having a supply of fuel with a substantially constant fluid pressure, $P_1$, a metering valve driven by an electronic computer for supplying fuel under pressure $P_2$ to a turbine, a bypass valve responsive to the fluid pressure $P_2$ for allowing a portion of the supply fuel to return to the source while a fluid differential pressure $P_1-P_2$ develops across the metering valve, said turbine responding to the fuel under pressure $P_2$ by rotating to produce a desired thrust for an engine, the improvement comprising:

a mechanical governor responsive to a rotational speed of the turbine above a preselected rotation for lowering the pressure differential $P_1-P_2$ across the metering valve by modifying the fluid pressure $P_2$ presented to the bypass valve to $P_2P$ whereby additional fuel is allowed to return to the source with a corresponding reduction in the fuel supplied to the turbine independently of the operation and position of the metering valve by the electronic computer to prevent an overspeed condition in the turbine, said mechanical governor having:
   cam means with first, second, third and fourth contour thereon;
   a speed sensor responsive to the rotation of the turbine for the development of an operational signal;
   a valve responsive to said operational signal for supplying a motive force for moving he cam means to a position corresponding to the rotation of the turbine; and
   feedback means responsive said first contour to provide said valve with an indication of the position of said cam means whereby said operational signal is nullified when the position of the cam means corresponds to the actual rotation of the turbine; p1 a sensor connected to said bypass valve, metering valve and mechanical governor, said sensor being responsive to the resulting pressure differential $P_1-P_2P$, said mechanical governor providing said sensor with an input when the turbine rotation is above the predetermined rotation whereby the bypass valve is correspondingly moved to allow additional fuel to return to the sources;
   integrator piston means located in the bypass valve and having a first surface exposed to an operational supply fluid pressure $P_2P$ and a second surface exposed to a reference fluid pressure $P_x$;
   sleeve means connected to said integrator piston means and extending into a bore, said bore having a first port connected to the supply fuel and a second port connected to the return reservoir, said sleeve means having a series of radial openings for connecting the first port to the second port through the sleeve means;
   proportional piston means located in said sleeve means and having a first face exposed to fluid pressure $P_1$ and a second face exposed to fluid pressure $P_2P$;
   first spring means for urging the integrator piston means toward a position to interrupt the flow of fuel through the radial openings in said sleeve means to the second port as a function of the force created by the pressure differential $P_2P-P_x$;
   second spring means for urging said proportional piston means toward a stop as a function of the force created by the pressure differential $P_1-P_2P$ to control the number of available radial openings through which fuel may flow to the second port; and
   a proportional valve responsive to the rotational speed of the turbine and connected to said bypass valve through said speed sensor for allowing fluid under pressure $P_2$ to flow through an opening and thereby lower the fluid pressure to $P_2P$, said integrator piston means responding to the lower fluid pressure $P_2P$ by moving to correspondingly position the radial openings in the sleeve means with respect to the second port such that additional fuel flows to the return conduit.

2. The fuel management system, as recited in claim 1, wherein said proportional valve includes;
   a first piston located in a bore, said bore having an entrance port and an exit port; and
   cam follower means located in said second contour and connected to said first piston, said cam follower allowing said first piston to open said entrance port and permit fluid to flow to the exit port as a function of the rotational speed of the turbine and thereby lower the fluid pressure in the sensor and bypass valve from $P_2$ to $P_2P$.

3. The fuel management system as recited in claim 2, wherein said entrance port for the proportional valve includes:
   a rectangular opening and a triangular opening, the movement of said first piston initially opening the rectangular opening to provide for a reduction of $P_2$ to $P_2P$ and as the rotation speed of the turbine increases to a first level above said preselected rotation to correspondingly increase the opening to include both the rectangular and triangular openings and thereby increase the flow to the entrance port.

4. The fuel management system as recited in claim 3, wherein said mechanical governor further includes:
   a flapper valve responsive to said third contour in the cam means for opening a third port to allow a second piston to move a second valve to a fully opened position where a fluid pressure $P_2P$ is created such that the fuel supplied to the turbine is limited to a fixed value of the normal rotation which will not damage the components therein.

5. The fuel management system as recited in claim 3, further including:
a flapper valve connected by a third cam follower to said third contour on the cam means; and
an integrator piston connected by a fourth cam follower to said fourth contour on the cam means, said third and fourth contours allowing said integrator piston to move at low speeds to a position to inform an operator that the overspeed governor is operating.

6. The fuel management system as recited in claim 3, wherein said mechanical governor further includes:
a flapper valve responsive to the third contour on the cam means for opening an orifice to allow additional fluid to flow from the sensor to further reduce the fluid pressure therein to $P_2P$ causing the bypass valve to correspondingly move and allow additional fuel to flow to the return.

7. The fuel management system as recited in claim 6, wherein said mechanical governor further includes:
a linkage having a first end located in said fourth contour and a second end connected to a second piston; and
a second valve secured to said linkage and having a face thereon for opening a port as a function of the movement of said second piston resulting from the operation of said flapper valve to allow said additional fluid to flow and establish the fluid pressure $P_2P$.

8. The fuel management system as recited in claim 7, wherein the flow of fluid as a result of the movement of the second piston occurs after the operation of the proportional valve.

9. The fuel management system as recited in claim 7, wherein said mechanical governor further includes:
means for checking out the operation of said second piston whereby said third contour opens said flapper valve and linkage moves in said fourth contour to hold second valve in a closed position while said second piston opens at rotational speeds of said turbine up to one half of its normal operational speed to provide an indication of the operational readiness of said mechanical governor.

10. The fuel management system as recited in claim 7, wherein said linkage on moving in said fourth contour holds said second valve in a substantially stationary position while allowing said second piston to move and activate a proximity sensor which provides operational information to an operator.

11. In a fuel management system having a supply of fuel with a substantially constant fluid pressure, $P_1$, a metering valve driven by an electronic computer for supplying fuel under pressure $P_2$ to a turbine, a bypass valve responsive to the fluid pressure $P_2$ for allowing a portion of the supply fuel to return to the source while a fluid differential pressure $P_1-P_2$ develops across the metering valve, said turbine responding to the fuel under pressure $P_2$ by rotating to produce a desired thrust for an engine, the improvement comprising:
a mechanical governor responsive to a rotational speed of the turbine above a preselected rotation for lowering the pressure differential $P_1-P_2$ across the cmetering valve by modifying the fluid pressure $P_2$ presented to the bypass valve to $P_2P$ whereby additional fuel is allowed to return to the source resulting in corresponding reduction in the fuel supplied to the turbine irrespective of the operation and position of the metering valve by the electronic computer to prevent an overspeed condition in the turbine, said mechanical governor having:
cam means with first, second, third and fourth contour thereon;
a speed sensor responsive to the rotation of the turbine for the development of an operational signal; review
a valve responsive to said operational signal for supplying a motive force for moving the cam means to a position corresponding to the rotation of the turbine;
feedback means responsive said first contour to provide said valve with a direct indication of the position of said cam means whereby said operational signal is nullified when the position of the cam means corresponds to the actual rotation of the turbine; and
means responsive to the second, third and fourth contours on said cam means for checking out the operational readiness of said mechanical governor at rotational speeds up to one half of the normal operational speed.

12. The fuel management system, as recited in claim 11 further including;
a sensor connected to said bypass valve, metering valve and mechanical governor, said sensor being responsive to the pressure differential $(P_1-P_2P)$, said mechanical governor providing said sensor with an input when the turbine rotation is above the predicted rotation whereby the bypass valve is thereafter correspondingly moved to allow additional fuel to return to the source.

13. The fuel management system, as recited in claim 12 wherein said bypass valve includes:
integrator piston means having a first surface exposed to an operational supply fluid pressure $P_2P$ and a second surface exposed to a reference fluid pressure $P_x$;
sleeve means connected to said integrator piston means and extending into a bore, said bore having a first port connected to the supply fuel and a second port connected to the return reservoir, said sleeve means having a series of radial openings for connecting the first port to the second port through the sleeve means;
proportional piston means located in said sleeve having a first face exposed to fluid pressure $P_1$ through said first port and a second face exposed to fluid pressure $P_2P$;
first spring means for urging the integrator piston toward a position to interrupt the flow of fuel through the radial openings in said sleeve means to the second port as a function of the force created by the pressure differential $P_2P-P_x$; and
second spring means for urging the piston means toward a stop as a function of the force created by the pressure differential $P_1-P_2P$ to control the number of available radial openings through which fuel may flow to the second port.

14. The fuel management system as recited in claim 13, wherein said mechanical governor further includes:

a proportional valve responsive to the rotational speed of the turbine and connected to said bypass valve through said sensor for allowing fluid under pressure $P_2$ to flow through an opening and thereby lower the fluid pressure to $P_2 P$, said proportional valve responding to the lower fluid pressure $P_2P$ by moving to correspondingly position the radial openings in the sleeve with respect to the second port that additional fuel flows to the return conduit.

* * * * *